US012607041B2

(12) United States Patent
Overgaard

(10) Patent No.: US 12,607,041 B2
(45) Date of Patent: Apr. 21, 2026

(54) ELECTROMECHANICAL DOOR LOCK ACTUATOR DEVICE FOR GLASS DOORS WITH NARROW FRAMES, A DOOR WITH SUCH DEVICE AND A RETROFIT METHOD

(71) Applicant: Danalock ApS, Harlev J (DK)

(72) Inventor: Henning Overgaard, Harlev J (DK)

(73) Assignee: Danalock ApS, Harlev J (DK)

( * ) Notice: Subject to any disclaimer, the term of this patent is extended or adjusted under 35 U.S.C. 154(b) by 143 days.

(21) Appl. No.: 18/385,993

(22) Filed: Nov. 1, 2023

(65) Prior Publication Data

US 2024/0076905 A1 Mar. 7, 2024

Related U.S. Application Data

(63) Continuation of application No. PCT/DK2021/050139, filed on May 3, 2021.

(51) Int. Cl.
*E05B 47/00* (2006.01)
*E05B 1/00* (2006.01)

(52) U.S. Cl.
CPC ........ *E05B 47/0012* (2013.01); *E05B 1/0007* (2013.01); *E05B 2047/002* (2013.01); *E05B 2047/0091* (2013.01); *E05B 2047/0095* (2013.01)

(58) Field of Classification Search
CPC ............... E05B 47/0012; E05B 1/0007; E05B 2047/002; E05B 2047/0091; E05B 2047/0095
See application file for complete search history.

(56) References Cited

U.S. PATENT DOCUMENTS

| | | | | |
|---|---|---|---|---|
| 5,678,436 | A | 10/1997 | Alexander | |
| 9,476,232 | B1 | 10/2016 | Verdecia et al. | |
| 9,546,504 | B2 | 1/2017 | Overgaard | |
| 10,443,264 | B1 * | 10/2019 | Son | E05B 63/0004 |
| 10,683,677 | B1 * | 6/2020 | Funamura | E05B 17/226 |
| 11,527,121 | B2 * | 12/2022 | Johnson | G07C 9/00571 |
| 11,697,951 | B2 * | 7/2023 | Witherby | E05B 1/0015 70/370 |
| 11,959,308 | B2 * | 4/2024 | Petty | E05B 47/0012 |
| 12,067,855 | B2 * | 8/2024 | Abueshsheikh | G08B 25/00 |
| 2006/0283219 | A1 | 12/2006 | Bendz et al. | |
| 2010/0011822 | A1 | 1/2010 | Ocaña | |
| 2010/0127517 | A1 | 5/2010 | Bliding et al. | |
| 2010/0154494 | A1 | 6/2010 | Sakai et al. | |
| 2014/0265359 | A1 * | 9/2014 | Cheng | E05B 47/0012 292/144 |
| 2015/0096341 | A1 * | 4/2015 | Overgaard | E05B 47/02 70/283.1 |
| 2018/0044943 | A1 * | 2/2018 | Tanaka | E05B 47/0012 |
| 2018/0061163 | A1 * | 3/2018 | Ku | E05B 63/0056 |

(Continued)

FOREIGN PATENT DOCUMENTS

| | | | |
|---|---|---|---|
| AT | 7270 | U1 | 12/2024 |
| CN | 111321940 | A | 6/2020 |

(Continued)

*Primary Examiner* — Mark A Williams
(74) *Attorney, Agent, or Firm* — Elevated IP, LLC

(57) ABSTRACT

An electromechanical door lock actuation device with an actuator module is mounted on a metal profile of a glass door such that the actuator module is offset from the door lock in order for the actuator module to not block opening of the door.

14 Claims, 3 Drawing Sheets

(56) References Cited

U.S. PATENT DOCUMENTS

| | | | | |
|---|---|---|---|---|
| 2019/0010731 | A1* | 1/2019 | Overgaard | E05B 47/026 |
| 2019/0112838 | A1* | 4/2019 | Grimm | F16P 3/10 |
| 2020/0199910 | A1 | 6/2020 | Khan | |
| 2021/0262251 | A1 | 8/2021 | Taniuchi et al. | |
| 2024/0076905 | A1* | 3/2024 | Overgaard | E05B 47/026 |

FOREIGN PATENT DOCUMENTS

| | | | |
|---|---|---|---|
| CN | 111379469 | A | 7/2020 |
| DE | 3311992 | A1 | 10/1984 |
| DE | 102004021704 | | 12/2005 |
| DE | 102014113764 | | 3/2016 |
| DE | 102017127982 | A1 | 5/2019 |
| EP | 3677738 | A1 | 7/2020 |
| EP | 3775444 | B1 | 9/2021 |
| FI | 12336 | U1 | 4/2019 |
| FR | 2849084 | B1 | 9/2005 |
| FR | 3098838 | B1 | 7/2021 |
| JP | H0725175 | U | 5/1995 |
| JP | 2018059391 | A | 4/2018 |
| JP | 2019015037 | A | 1/2019 |
| WO | 2005024160 | A1 | 3/2005 |
| WO | 2008101928 | A1 | 8/2008 |
| WO | 2016194304 | A1 | 12/2016 |
| WO | 2017114534 | A1 | 7/2017 |
| WO | 2020003487 | A1 | 1/2020 |
| WO | 2020124308 | A1 | 6/2020 |

* cited by examiner

ELECTROMECHANICAL DOOR LOCK ACTUATOR DEVICE FOR GLASS DOORS WITH NARROW FRAMES, A DOOR WITH SUCH DEVICE AND A RETROFIT METHOD

CROSS-REFERENCE TO RELATED APPLICATIONS

This application is a continuation under 35 U.S.C. 111 of International Patent Application No. PCT/DK2021/050139, filed May 3, 2021, which is hereby incorporated by reference in its entirety.

FIELD OF INVENTION

The present invention relates to an electromechanical door lock actuator device. It also relates to a glass door with such device and to a retrofit method for mounting such device on a glass door.

BACKGROUND

International patent application WO2017/114534 by Overgaard and assigned to Danalock discloses an electromechanical door lock actuator that is mounted to the surface of a door blade for actuating a door lock inside the door blade. The actuator has a cylindrical casing inside which there is provided a battery-driven motor. The motor rotates a pin-receiver that connects to a driver-pin extending from the door lock into the back of the actuator. The pin-receiver is rotated by the motor when the actuator is operating due to a wireless signal starting the motor in one or the other direction. A manual turning-knob is provided for locking and unlocking by hand instead of the motor.

U.S. Pat. No. 9,546,504 by Overgaard discloses an electromechanical door lock actuator of similar construction with respect to a central pin-receiver that is rotated by a motor. Three types of adapters are provided for adapting the pin-receiver to the specific type of driver-pin of the door lock.

International patent application WO2005/024160 assigned to Aptus Elektronik AB discloses an electromechanical door lock actuator with a manual turning lock handle which is connected to the door lock by a driver-pin.

International patent application WO2016/194304 discloses an electromechanical door lock actuator with a lock motor/handle module and an adapter module for gripping and rotating the already existing knob on the door lock. For proper fitting, the module can be equipped with couplings having grooves of different lengths and widths.

Specifically for American locks, US2010/0011822 discloses a lock unit for insertion, which is modified in order to provide a pin-connector between the actuator and the lock unit. Adaptation of the insertable US lock cylinder is also disclosed in US2010/0154494.

All these locks are provided with adaptable connectors. However, for glass doors that have narrow profiles around the glass, the lock is provided close to the edge of the profile. In practice, it has turned out that the existing adaptable electromechanical door lock actuators have a height that is too large for such doors so that the actuators collide with the vertical part of the frame around the door, and the door cannot freely open if such locks are installed. For this reason, such glass doors are equipped with electromechanical door lock actuators that are specially designed for such type of doors. However, some types of retrofit door locks that are not especially designed for glass doors have gained popularity due to their versatility, adaptability and ease of use. It would be desirable if such locks could be adaptable to glass doors.

BRIEF DESCRIPTION

It is therefore an objective of the invention to provide an improvement in the art. In particular, it is an objective to provide a more universal door lock actuator device for specific types of glass doors with narrow profiles around the glass panel. This objective and further advantages are achieved with electromechanical door lock actuator devices as set forth herein.

In short, an electromechanical door lock actuation device, comprising an actuator module, is mounted on a metal profile of a glass door such that the actuator module is offset from the door lock in order for the actuator module to not block opening of the door.

In particular, the device is mounted to the surface of a vertical stile profile in a glass door, especially where the stile profile is narrow.

A typical door where the device is particularly useful is a door of the type comprising a glass panel surrounded by metal profiles, where the door by its profiles is hinged in a surrounding frame for forming a hinged door by the glass panel in combination with the metal profiles. The metal profiles that are surrounding the glass panel comprise a vertical stile profile in which a door lock is provided. Typically, the door lock comprises a lock bolt for locking the door to the frame, wherein the lock bolt is actuated by a cam of a lock insert inside the vertical stile profile.

Often, the lock inserts of such doors have a key slot and are operated by a key. Alternatively, the lock inserts are operated by a rotational handle, for example a door knob. For a retrofit where the manual operation is exchanged into an electromechanical operation, the handle is removed. Often, the lock insert has to be modified or exchanged for a retrofit in order to make it fit and cooperate with the electromechanical door lock actuation device.

For example, the lock insert is of the type that is commonly used in the US, where the lock insert has a cylindrical part with a threading on an outer side of the cylindrical part. For the specific door as described above, the vertical stile profile would then have a cooperating thread in a cylindrical recess for receiving the lock insert or a corresponding retrofit lock insert in the recess.

For the retrofit, the existing lock insert often has to be removed from the door, such as unscrewed from the door, and modified or exchanged, so that the retrofit lock insert comprises an extending connector-pin for which the device is configured to receive and rotate for driving the door lock bolt. This is described in more detail in the following.

The electromechanical door lock actuation device comprises a connector module with a cover plate. The connector module contains a rotational connector-receiver under the cover plate. During the retrofit, when the connector-pin and a fitting lock insert have been provided, the connector-receiver is connected by the connector-pin to the cam of the lock insert. Rotation of the connector-pin by the connector-receiver leads to rotation of the cam for actuating the lock bolt by the cam.

The electromechanical door lock actuation device further comprises an actuator module with a casing and an electrical motor inside the casing. The motor is functionally and mechanically connected to the connector-receiver through a gear wheel arrangement for operation of the motor to rotate gear wheels in the gear wheel arrangement and rotate the combination of the connector-receiver, the connector-pin, and the cam.

Advantageously but not necessarily, the actuator module comprises a handle in addition to the motor for manually rotating the connector-receiver through the arrangement of intermeshing gear wheels as an alternative to the rotation by the motor.

Optionally, the casing of the actuator module also contains batteries for powering the motor as well as electronics for controlling the locking and unlocking action by the motor through the connector-receiver. The electronics comprise a controller for the motor and optionally also a wireless transceiver for wireless communication for receiving wireless commands for locking and unlocking and for delivering wireless status information. With such wireless control, the door lock can be operated electromechanically by wireless command signals, for example from a smartphone to the actuator module, or via other wireless data communication means, such as WiFi.

In practical embodiments, the connector module comprises a rear plate or rear profile with a rear side that is abutting the vertical stile profile and with an opposite side carrying the actuator module as well as the cover plate in a side-by-side relationship.

As discussed before, the actuator module is often having a height, when measured laterally from the door plane, which would result in the actuator module colliding with the frame when the door is swinging to or from the closed orientation. For this reason, the actuator module is offset from the connector-receiver in a direction away from the frame at the location of the door lock. The connector module has a height H1 at the location of the connector-receiver, including the cover plate, which is less than the height H2 of the actuator module. The height H1 is designed in relation to the door such that it allows opening and closing of the door. A useful height H1 is in the range of 10 mm to 30 mm. The offset of the actuator module, which is much higher than the connector module, prevents collision of the actuator module with the frame when the door is swinging in the frame between an open and a closed position. For example, the height H1 of the connector module is no more than half the height H2 of the actuator module, possibly even no more than one third of H2.

However, the offset may imply that the actuator module, for example after retrofit, is extending over the glass panel to a location remote from the vertical stile profile. This is so if the device has a lateral extension W2 in a direction lateral to the vertical stile profile, and W2>W1, where W1 is the width of the vertical stile profile of the door and parallel to the door.

The operation of the motor can be regulated by a controller in various ways. Important is that the motor is stopped when the lock bolt of the lock has moved to an end position or at least to a position where the locking or unlocking is safeguarded.

For example, the lock bolt is driven until it meets a hardware stop, which makes further driving of the lock bolt by the motor impossible, increasing the power consumption of the motor, which is measured electronically and the motion of the motor is stopped in this direction. Alternatively, an angular motion decoder is used which controls the angular maximum or at least sufficient rotation of the connector-receiver and stops the motor prior to the lock bolt reaching a hardware stop.

The motor of the device can in principle be activated by power from a power source that is started by manually pushing a push button contact that closes an electrical circuit. Instead of the push button contact, an electrical relay switch can be used, for example operated automatically. Alternatively or in addition, the motor is activated by turning of the handle; a decoder reads the turning of the connector-receiver by the manually rotatable handle, which activates the motor in order to assist the user in locking or unlocking the door.

As a particularly advantageous option, the device is operated remotely by a wireless signal. For example, the device comprises a receiver inside the casing for receiving and executing wireless digital command data for locking or unlocking the door lock, the receiver being functionally coupled to the motor for activating the motor in dependence of the locking or unlocking command. For example, the receiver is configured for wireless digital command signals, for example Bluetooth, WIFI, Z-wave, ZigBee, or other radio frequency signals. An integrated circuit inside the casing is configured and programmed for activating the motor in either direction upon receiving a corresponding wireless command signal by the receiver, for example from a smartphone or pager. Typically, however, the device will contain a transceiver for bidirectional digital communication with a programmable computer system for controlling the device remotely, for example by a smartphone or other type of computer, optionally with encrypted digital communication. The latter can be achieved with corresponding encryption keys communicated between the integrated circuit and the smartphone or other type of computer that is used for remotely operating the device. Also, additional WiFi transmission to multiple devices is an option.

BRIEF DESCRIPTION OF THE DRAWINGS

The invention will be explained in more detail with reference to the drawings, where.

DETAILED DESCRIPTION

Figure 1:
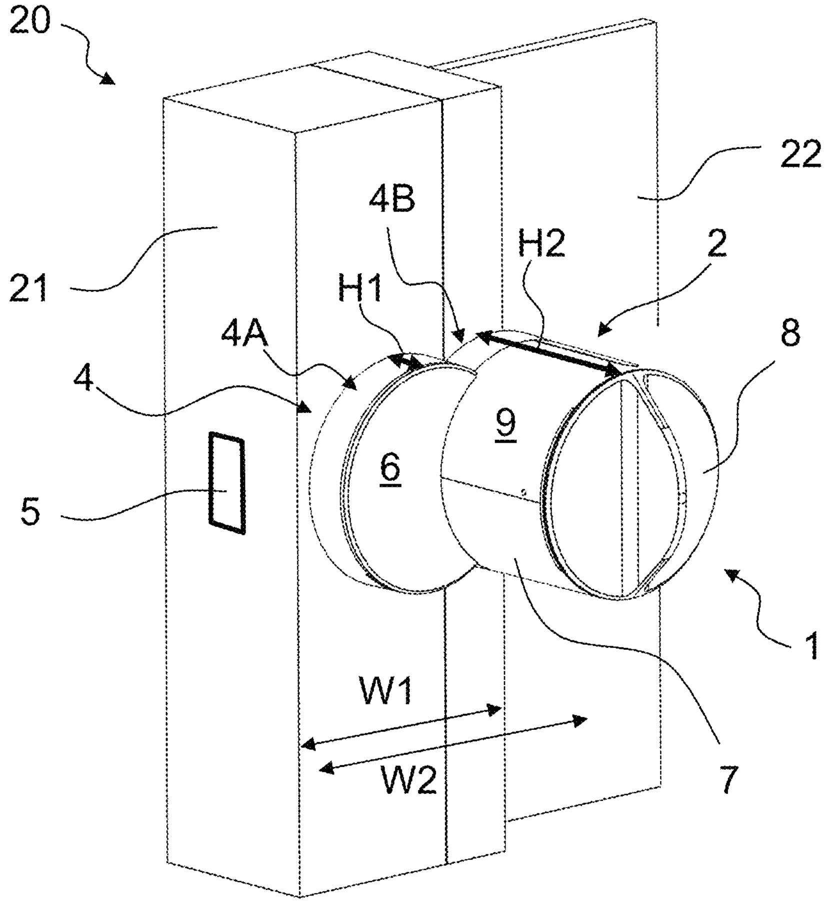
FIG. 1 illustrates a device in perspective view when mounted onto a glass door.
Figure 5:
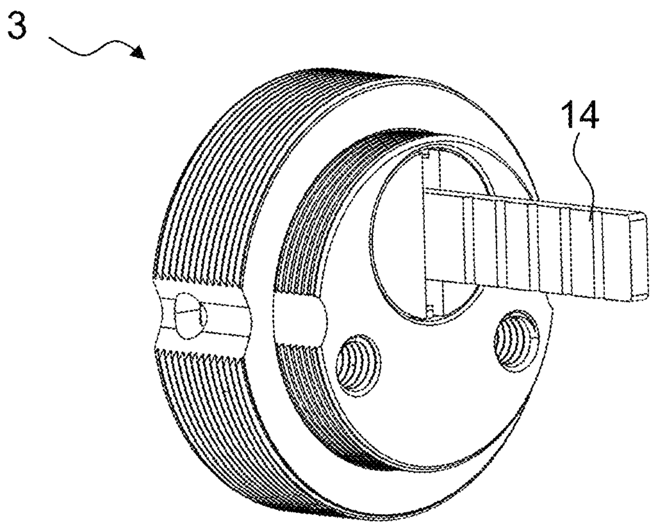
FIG. 5 shows a lock insert.

FIG. 1 illustrates an electromechanical door lock actuator device 1 when mounted onto a vertical stile profile 21 of a door 20. The door 20 comprises a glass panel 22 that is framed by surrounding profiles, of which the vertical stile profile 21 is one that is mechanically connected to the other surrounding profiles. A lock insert 3, as illustrated in FIG. 5, is mounted inside the stile profile 21 and activated by the device 1. The lock insert 3 activates a lock bolt 5 in the stile profile 21.

The device 1 comprises a double-module with an actuator module 2 and a connector module 4, the latter connecting the actuator module 2 with the lock insert 3.

Whereas the connector module 4 is located over the lock insert 3, the actuator module 2 is offset towards the glass panel 22. The height H1 of the connector module 4, as measured perpendicular to the stile profile 21, is much less than the height H2 of the actuator module 2. For example, H1 is in the range of 10-30 mm, which has been found useful for such doors.

Figure 2:
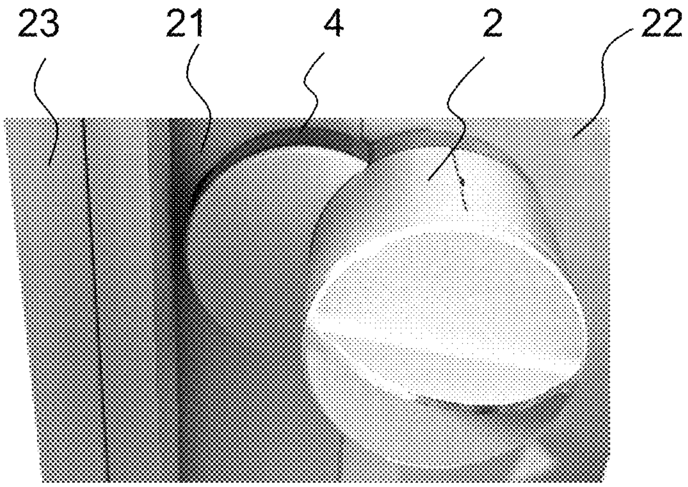
FIG. 2 is a photo of a real situation where the device is mounted onto a glass door.

As best illustrated in the photograph of FIG. 2, the problem of the actuator module 2 with a given height H2 colliding with the frame 23 around the door 20 is eliminated. FIG. 2 also illustrates that a mounting of the actuator module 2 at the position of the connector module 4 would prevent the door from opening, as the actuator module 2 during opening would collide with the frame 23.

An advantage of the device 1 is that an adapter module 2 of a given height, which is successfully used for other types of doors, can also be employed on glass doors with narrow stile profiles 21 at the position of the lock insert 3.

As illustrated, the connector module 4 connects the actuator module 2 with the lock insert 3 by extending from the lock insert position on stile profile 21 towards the glass panel 22 and potentially even over the glass panel 22. The connector module 4 has a first portion 4A that covers the lock insert 3 and a second portion 4B onto which the actuator module 2 is mounted. The second portion extends to and over the glass panel in the shown illustration. The first portion 4A and the second portion 4B are positioned side-by-side so that the actuator module 2 is offset laterally from the lock insert 3 in a direction away from the frame 23.

As illustrated in FIG. 1, the vertical stile profile 21 has a width W1, and the device 1 has a lateral extension W2 in a direction lateral to the vertical stile profile 21 and parallel to the door 20, where W2 is larger than W1. Thus, the actuator module 2 extends over the glass panel 22 to a location remote from the vertical stile profile 21.

The actuator module 2 has a cylindrical wall 7 that extends from the connector module 4 to a manual handle 8 that functions as a cover of the actuator module 2. The manual handle 8 can be used for manually locking and unlocking the door in additional to the motorized function. As part of the cylindrical wall 7 of the actuator module 2, a door 9 is provided for access to batteries 10 inside the actuator module 2.

A cover plate 6 of the connector module 4 covers the interior of the connector module 4 at the location of the lock insert 3 in the stile profile 21 underneath the connector module 4.

Figure 3:
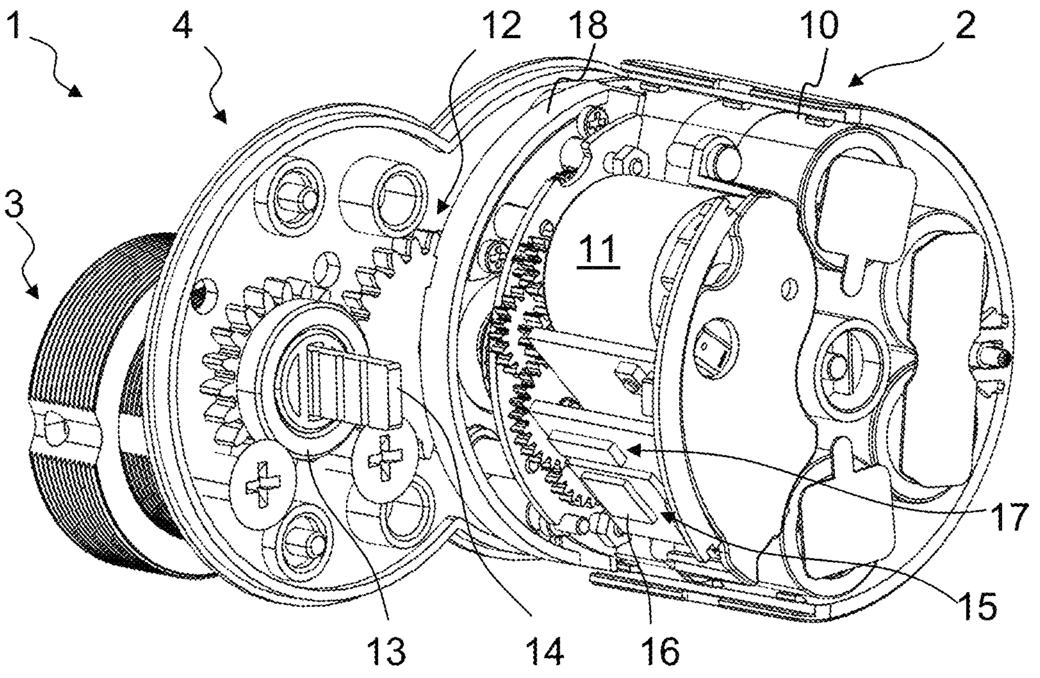
FIG. 3 shows the device when part of the casing is removed.

FIG. 3 illustrates the device 1 in a view where the walls 4A, 4B and 7 and the cover plate 6 have been removed in order to reveal the interior.

The actuator module 2 comprises a number of batteries 10 for providing electricity to a motor 11, which by switching current-direction can be driven in opposite directions. In operation, the motor 11 drives an arrangement 12 of intermeshing gear wheels. The gear wheels of the actuator module 2 intermesh with the gearwheels of the connector module 4.

The connector module 4 comprises a connector-receiver 13 for connecting the motor-driven gearwheel arrangement 12 to a rotational lock-actuator connector-pin 14 of the door lock.

The actuator module 2 comprises electronics 15 for controlling the locking and unlocking action by the motor 11 through the adapter module 3. The electronics 15 comprise a controller 16 for the motor 11 and a wireless transceiver 17 for receiving digital wireless commands, for example programming commands or actuation commands, and for delivering wireless status information.

Typically, the wireless communication is done by Bluetooth with a smartphone and/or through a WiFi system. Various other options exist, including Z-wave, ZigBee, or other types of radio frequency signals.

The controller 16 comprises a start/stop function that rotates the rotational connector-receiver 13, and thus connector-pin 14 of the door lock insert 3, until the door's lock bolt 5 reaches appropriate positions for an open or closed state of the door 20. The start-stop function can be programmed into a computer program of the controller 16, or can be achieved by a sensor that measures resistance of the lock bolt 5. For example, the controller is programmed to control the angular movement of the connector-pin 14, which is related to the travel distance of the lock bolt 5, in order to make sure that the lock bolt 5 has been moved sufficiently to actually lock the door 20.

The actuator module 2 comprises a base plate 18 which is the lower end of the actuator module 2. The base plate 18 is mounted to the connector module 4, which in turn is mounted to the door 20. Thus, the connector module 4 is located between the actuator module 2 and the door 20. The gear wheels of the actuator module 2 are intermeshing with the gear wheels of the connector module 4 for driving the connector-receiver 13 by the motor 11.

Figure 4:
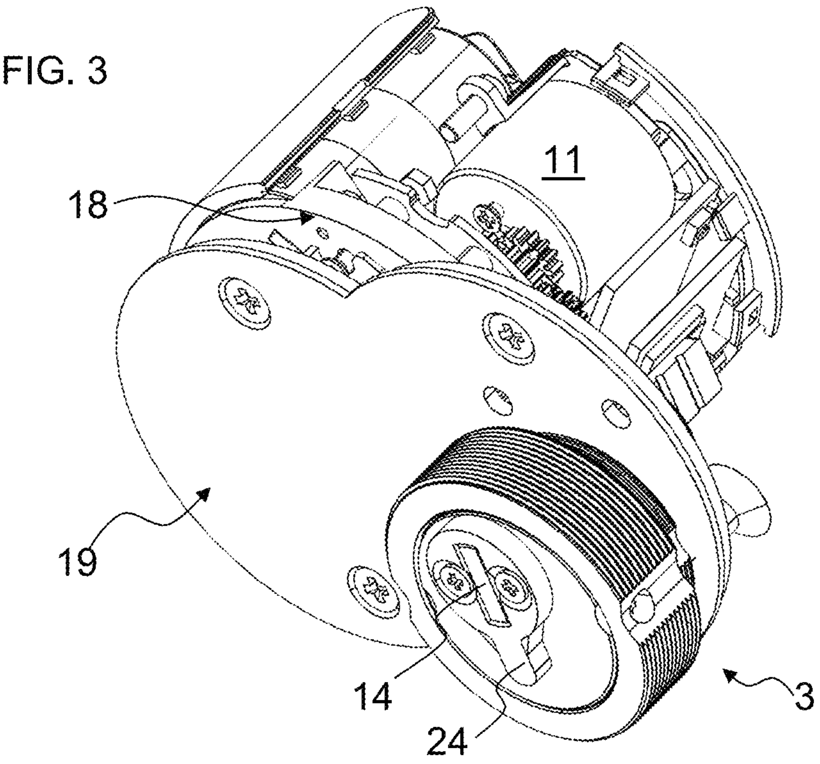
FIG. 4 is a rear view of the device.

FIG. 4 illustrates the rear side of the connector module 4, the plane surface of which is abutting the surface of the door 20 when mounted. The lock insert 3 comprises a cam 24 that is connected to the connector-pin 14 and which by rotation is actuating the lock bolt 5 when the connector-pin 14 is rotated by the motor 11.

When the device is mounted to the door 20, the lock insert 3 is mounted in the vertical stile profile 21 of the door, and the connector-pin 14 is guided into the connector-receiver 13 when the rear plate 19 of the connector module 4 is mounted on the surface of the vertical stile profile 21 in an orientation such that the actuator module 2 is distal to the frame 23 around the door 20.

REFERENCE NUMBERS

1—electromechanical door lock actuator device
2—actuator module
3—lock insert
4—connector module
4A— first portion of connector module 4 which covers the lock insert 3
4B— second portion onto which the actuator module 2 is mounted
5—lock bolt
6—cover plate of adapter module
7—cylindrical wall of actuator module 2
8— manual handle
9—battery door
10—battery
11— motor
12—arrangement of intermeshing gear wheels
13—connector-receiver
14—connector-pin
15—electronics
16— controller
17—wireless transceiver
18—base plate of actuator module 2
19— rear plate of connector module 4
20— door
21—vertical stile profile
22—glass panel
23—frame
24— cam for driving lock bolt 5

What is claimed is:

1. A door comprising a glass panel surrounded by metal profiles, the door being hinged in a surrounding frame for forming a hinged door by the glass panel in combination with the metal profiles, wherein the metal profiles surrounding the glass panel comprise a vertical stile profile in which a door lock is provided, the door lock comprising a lock bolt for locking the door to the frame, wherein the lock bolt is actuated by a cam of a lock insert inside the vertical stile profile;

wherein an electromechanical door lock actuation device is mounted to the surface of the vertical stile profile;

wherein the electromechanical door lock actuation device comprises:

a connector module comprising a cover plate and containing a rotational connector-receiver under the cover plate, wherein the connector-receiver is connected by a connector-pin to the cam of the lock insert for by rotation of the connector-pin by the connector-receiver rotating the cam and actuating the lock bolt by the cam for locking and unlocking the door;

an actuator module comprising a casing and an electrical motor inside the casing, wherein the motor is functionally and mechanically connected to the connector-receiver through a gear wheel arrangement for by operation of the motor to rotate gear wheels in the gear wheel arrangement and rotate the combination of the connector-receiver, the connector-pin, and the cam;

wherein the actuator module comprises a handle for manually rotating the connector-receiver through the arrangement of intermeshing gear wheels as an alternative of the rotation by the motor;

wherein the connector module comprises a rear plate with a rear side abutting the vertical stile profile and with an opposite side carrying the actuator module and the cover plate in a side-by-side relationship;

wherein the actuator module is offset from the connector-receiver in a direction away from the frame at the location of the door lock;

wherein a height H1 of the connector module at the location of the connector-receiver, including the cover plate, is less than a height H2 of the actuator module for preventing collision of the actuator module with the frame when the door is swinging in the frame between an open and a closed position.

2. The door according to claim 1, wherein the vertical stile profile has a width W1, and wherein the device has a lateral extension W2 in a direction lateral to the vertical stile profile and parallel to the door, wherein W2 is larger than W1 for the actuator module extending over the glass panel to a location remote from the vertical stile profile.

3. The door according to claim 1, wherein H1 is less than half of H2.

4. The door according to claim 3, wherein H1 is in a range of 10 mm to 30 mm.

5. The door according to claim 1, wherein H1 is in a range of 10 mm to 30 mm.

6. The door according to claim 1, wherein the casing of the actuator module contains batteries for powering the motor as well as electronics for controlling the locking and unlocking action by the motor through the connector-receiver, wherein the electronics comprise a controller for the motor and a wireless transceiver for wireless communication for receiving wireless commands for locking and unlocking and for delivering wireless status information.

7. The door according to claim 1, wherein the lock insert has a cylindrical part with a threading on an outer side of the cylindrical part and wherein the vertical stile profile has a cooperating thread in a cylindrical recess for receiving the lock insert in the recess.

8. An electromechanical door lock actuation device for mounting to the surface of a vertical stile profile in a door comprising a glass panel surrounded by metal profiles, the door being hinged in a surrounding frame for forming a hinged door by the glass panel in combination with the metal profiles, wherein the metal profiles surrounding the glass panel comprise a vertical stile profile in which a door lock is provided, the door lock comprising a lock bolt for locking the door to the frame, wherein the lock bolt is actuated by a cam of a lock insert inside the vertical stile profile;

wherein the electromechanical door lock actuation device comprises:

a connector module comprising a cover plate and containing a rotational connector-receiver under the cover plate, wherein the connector-receiver is configured for being connected by a connector-pin to the cam of the lock insert for by rotation of the connector-pin by the connector-receiver rotating the cam and actuating the lock bolt by the cam for locking and unlocking the door;

an actuator module comprising a casing and an electrical motor inside the casing, wherein the motor is functionally and mechanically connected to the connector-receiver through a gear wheel arrangement for by operation of the motor to rotate gear wheels in the gear wheel arrangement and rotate the combination of the connector-receiver, the connector-pin, and the cam;

wherein the actuator module comprises a handle for manually rotating the connector-receiver through the arrangement of intermeshing gear wheels as an alternative of the rotation by the motor;

wherein the connector module comprises a rear plate with a rear side for abutting the vertical stile profile and with an opposite side carrying the actuator module and the cover plate in a side-by-side relationship;

wherein the actuator module is offset from the connector-receiver in a direction away from the frame at the location of the door lock wherein a height H1 of the connector module at the location of the connector-receiver, including the cover plate, is less than a height H2 of the actuator module for preventing collision of the actuator module with the frame when the door is swinging in the frame between an open and a closed position.

9. The device according to claim 8, wherein the casing of the actuator module contains batteries for powering the motor as well as electronics for controlling the locking and unlocking action by the motor through the connector-receiver, wherein the electronics comprise a controller for the motor and a wireless transceiver for wireless communication for receiving wireless commands for locking and unlocking and for delivering wireless status information.

10. The device according to claim 9, wherein the casing of the actuator module is cylindrical and wherein H1 is less than half of H2.

11. The device according to claim 10, wherein H1 is in a range of 10 mm to 30 mm.

12. The device according to claim 8, wherein H1 is in a range of 10 mm to 30 mm.

13. A method for retrofitting an electromechanical door lock actuation device according to claim 6 in a framed glass door, the method comprising:

providing a door that comprises a glass panel surrounded by metal profiles, the door being hinged in a surrounding frame for forming a hinged door by the glass panel in combination with the metal profiles, wherein the metal profiles surrounding the glass panel comprise a vertical stile profile in which a door lock is provided, the door lock comprising a lock bolt for locking the door to the frame, wherein the lock bolt is actuated by a cam of a lock insert inside the vertical stile profile; wherein the door lock insert is manually operated by a handle or key for opening and closing the door;

wherein for the retrofit, the method comprises:

removing the existing lock insert from the door;

modifying or exchanging the lock insert to a retrofit lock insert that comprises an extending connector-pin;

mounting the device to the surface of the vertical stile profile with the connector-pin extending into the connector-receiver and the device oriented such that the actuator module is offset from the connector-receiver in a direction away from the frame at the location of the door insert for preventing collision of the actuator module with the frame when the door is swinging in the frame between an open and a closed position.

14. The method according to claim 13, further comprising operating the door lock electromechanically by wireless command signals from a smartphone to the actuator module.

* * * * *